Aug. 29, 1950 J. BERTSCHI 2,520,828
MOTOR GENERATOR CONSTRUCTION
Filed Dec. 27, 1947 2 Sheets-Sheet 1
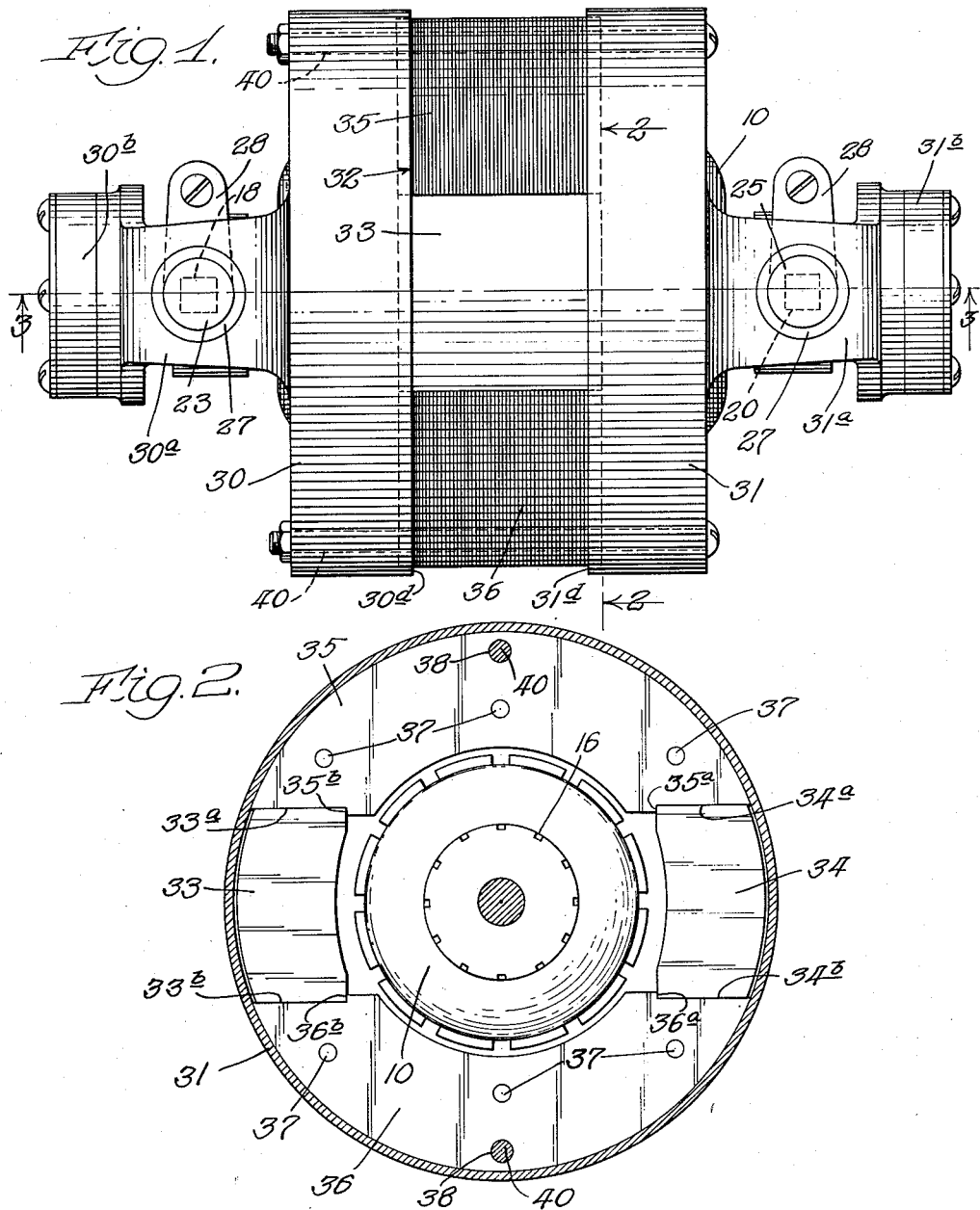
Inventor:
Jacob Bertschi,
By Chritton, Schroeder, Merriam & Hofgren,
Attys.

Aug. 29, 1950 J. BERTSCHI 2,520,828
MOTOR GENERATOR CONSTRUCTION
Filed Dec. 27, 1947 2 Sheets-Sheet 2
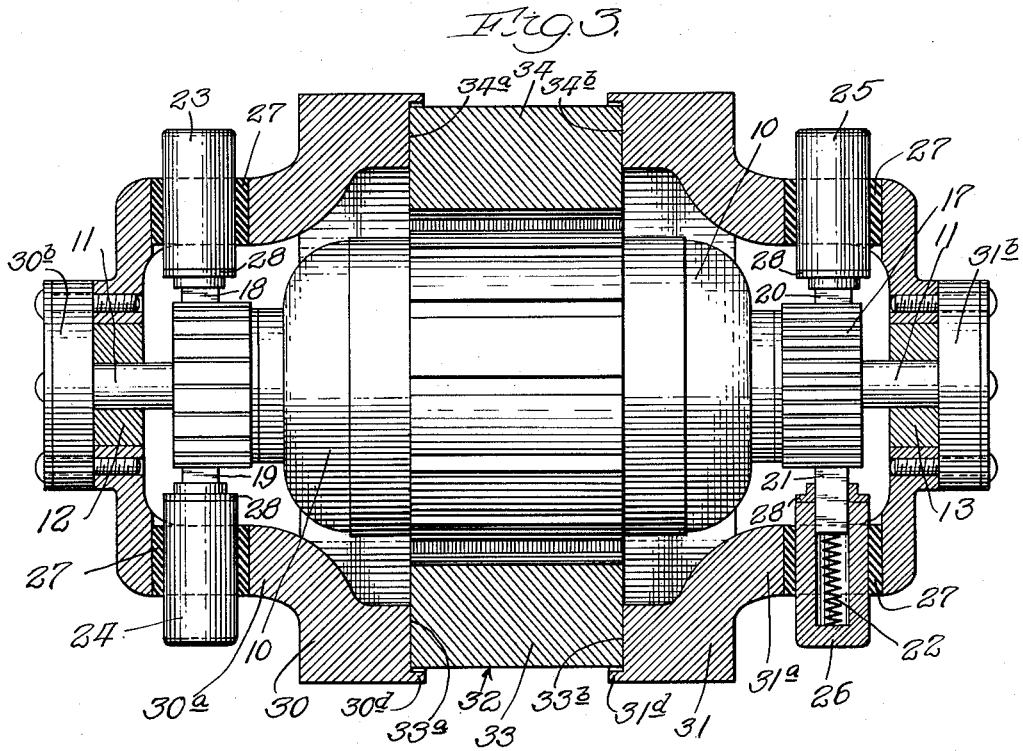
Inventor:
Jacob Bertschi Patented Aug. 29, 1950

2,520,828

UNITED STATES PATENT OFFICE 2,520,828

MOTOR-GENERATOR CONSTRUCTION

Jacob Bertschi, Chicago, Ill., assignor to Carter Motor Company, a corporation of Illinois Application December 27, 1947, Serial No. 794,135

2 Claims. (Cl. 171—252)

1

This invention relates to motor-generator construction, and more particularly to a novel construction of the magnetic structure and its association with other parts of the apparatus.

One feature of this invention is that it provides an improved motor-generator.

Another feature of this invention is that it provides a field ring for a motor-generator comprising at least one permanent magnet member and a pair of field members of magnetic material abutting said magnet member adjacent opposite magnetic poles thereof.

Another feature of this invention is that it provides an improved field ring for a motor-generator, said field ring including a cast permanent magnet member of very hard material.

A further feature of this invention is that it provides a motor-generator having a rotor housing comprising a field ring with a pair of oppositely disposed magnet members of very hard material and a separate pair of field members of conventional ferrous magnetic material (relatively soft material as compared with the magnet members) abutting said magnet members, and a pair of non-magnetic end bearing brackets forming a seat for the field ring.

Still a further feature of this invention is that at least one of the end bearing brackets forming part of the housing is readily removable, providing for easy substitution of a different rotor and end bearing.

Other features and advantages of this invention will be apparent from the following specification and from the drawings in which:

Fig. 1 is a side elevation of a motor-generator constructed in accordance with my invention;

Fig. 2 is a transverse vertical section through the apparatus of Fig. 1 along the line 2—2 of Fig. 1;

Fig. 3 is a longitudinal horizontal section through the apparatus of Fig. 1 along the line 3—3 of Fig. 1; and Fig. 4 is a perspective view of the magnetic field ring.

The development in recent years of greatly improved permanent magnet materials, as for example aluminum-nickel alloys, has brought about many new problems in the mechanical construction of the magnetic structure of motors, motor-generators and the like. While aluminum-nickel alloys may be formed into magnets of great permanence and of exceedingly high magnetic strength, the material is so very hard that it cannot be machined by any of the usual methods, but must be cast and then ground to

2 the desired shape. Obviously, it is desirable to eliminate as much of the labor incident to forming the magnetic structure of a motor-generator as is possible. In addition, these improved very hard materials are more expensive than are the softer ferrous materials formerly used in magnetic structures, and it is desirable to reduce to a minimum the quantity of aluminum-nickel alloy used in the magnetic structure.

I have devised and am here disclosing and claiming an improved motor-generator construction wherein the field ring of the magnetic structure comprises at least one permanent magnet member and a pair of field members of magnetic material abutting said magnet member adjacent opposite poles thereof. This field ring forms part of the rotor housing, and is seated between a pair of non-magnetic end bearing brackets. The end bearing brackets each have a peripheral flange forming a recessed shoulder to seat the magnet members and the field members and to hold such members against outward movement; and the field members each have shoulders to seat the magnet members and hold them against inward movement. In addition the magnet members are slightly undersize in their width or radial dimension as shown in Figs. 2, 3 and 4 to insure that they fit within the pocket formed by the shoulders of the end brackets and field members. These features permit construction of a motor-generator by merely laying the two field members and the permanent magnet members together, slipping the end bearing brackets in place, and joining the whole structure together by a simple securing means, as for example one or more bolts. This construction results in ease and economy of manufacture since the permanent magnet members form only a small portion of the field ring and the magnet members may be cast and then need be ground on two sides only (the sides which abut the field members). Grinding the outer surface of the magnets is made unnecessary by the undersize construction which insures that the magnets will fit in the pockets formed by the shoulders of the field members and end brackets. If the entire field ring were made of aluminum-nickel alloy, the original cost of the material would be increased and the labor costs would be greatly increased since it would be necessary to grind the material on several sides.

Referring now to the drawings, the motor-generator illustrated comprises a rotor 10 having the usual motor and generator windings thereon. The rotor is mounted on a shaft 11 which is mounted in bearings 12 and 13 at the respective opposite ends of the machine. Such bearings may be of any suitable anti-friction type such as ball bearings, roller bearings or the like.

The rotor shaft 11 carries near each of its ends commutators 16 and 17, the ends of the motor windings being connected to the segments of one of these commutators while the ends of the generator windings are connected to the segments of the other commutator. A pair of oppositely disposed brushes 18 and 19 bear against the commutator 16, and a pair of oppositely disposed brushes 20 and 21 bear against the commutator 17. The brushes are pressed against the commutator by springs, as the spring 22 of Fig. 3, and each brush assembly is mounted in a brush holder 23—26. These brush holders are insulated from the rest of the machine by insulating members 27, and a connecting arm 28 projects outwardly from each brush holder to provide a terminal to which one or more electrical conductors may be connected.

Since the general construction and operation of motor-generators of this general type are well known, the construction and operation will not be further described here, and reference may be had to the prior art (as for example Kongsted Patent No. 1,907,831) to supplement the present disclosure if desired.

The present invention resides in the construction of the magnetic structure of the motor-generator and in the association of said magnetic structure with the other parts of the apparatus. As may be seen in Figs. 1 and 3, a housing for the rotor 10 is formed by a pair of end bearing brackets 30 and 31 which are mounted in spaced relation and seat therebetween a field ring designated generally at 32 which forms the center portion of the housing. The respective brackets 30 and 31 include yoke portions 30a and 31a which mount the brush holders 23—26, and at the outer end of each of these yoke portions are portions 30b and 31b which carry the bearings 12 and 13.

The field ring 32 which comprises the central portion of the rotor housing is best shown in Fig. 4. The ring comprises a pair of oppositely disposed permanent magnet members 33 and 34 and a pair of abutting field members 35 and 36. The magnet members are cast from a very hard permanently magnetic material, as for example an aluminum-nickel alloy. While no specific limitations regarding the particular material used are to be implied from this specification, it will be understood that the term "very hard material" as used in this specification and claims refers to a material which is so hard that it cannot be machined, but must be ground. As shown in Figs. 2 and 4 the magnet members 33 and 34 have an arcuate outer surface, and each of said members is magnetized so that the opposite ends of each, as the ends 33a—33b and 34a—34b form opposite magnetic poles.

The separate field members 35 and 36 which abut the magnet members 33 and 34 each comprise a plurality of laminations having an arcuate outer surface of greater radius than the arcuate outer surface of the magnet members 33 and 34. The laminations comprising the members 35 and 36 may be stamped from any magnetic material, preferably of relatively soft (compared with the material of the members 33 and 34) ferrous material, as commercial transformer steel. The laminations comprising each of the members 35 and 36 may be held together by a plurality of pins 37 extending through each of the members 35 and 36, and a passageway 38 is formed through each of the members 35 and 36 for the purpose of mounting said members.

Each field member has a shoulder abutting the inner surface of the adjoining magnet member, and in assembling the magnetic structure the members 35 and 36 are abutted against each of the magnet members 33 and 34 adjacent opposite magnetic poles of said magnet members, with the shoulders 35a and 35b of the member 35 supporting one end of each of the permanent magnet members against inward movement and the shoulders 36a and 36b of the member 36 supporting the other end of each of the magnet members against inward movement.

As shown in Fig. 3 each of the brackets 30 and 31 has a peripheral flange 30a and 31a respectively extending parallel to the longitudinal axis of the rotor, and one end of the field ring is adapted to be seated in the shoulder formed by the cup-shaped end of each of the brackets 30 and 31. The magnet members 33 and 34 are made slightly undersize, as $\frac{1}{32}$ inch, in width (the horizontal dimension as the parts appear in Fig. 2) to insure that such members seat within the shoulders formed by the flanges on the end brackets without the necessity of grinding the inner or outer surface of such members. Oppositely disposed openings are formed through the brackets 30 and 31, and bolts 40 are passed through the openings in the brackets and the openings 38 in the field members, thereby securing the brackets 30 and 31 in spaced relation with the field ring seated therebetween so that brackets and the field ring form a housing for the rotor 10.

The bearing brackets 30 and 31 must be of non-magnetic material so that the field between the field members 35 and 36 is not shorted out. While these brackets may be made of any suitable non-magnetic material, as for example brass, I prefer to form the brackets of aluminum in order to achieve a lighter construction. Reference to Fig. 1 will show that the brackets 30 and 31 (and particularly the bracket 30) are readily removable, the only operation necessary to remove bracket 30 being the removal of the nuts from the bolts 40. By providing the motor-generator with readily removable end brackets, I am able to provide alternate rotor and commutator assemblies which may easily be substituted to change the characteristics of the motor-generator. For example, if it were desired to provide the motor-generator of Fig. 1 with two or more simultaneously operable outputs, it would merely be necessary to remove the nuts from the bolts 40 and remove the bracket 30. This would permit the rotor to be removed so that a different rotor having two or more commutators on the output side thereof could be inserted in place and a different bearing bracket of the proper size and having the proper number of brushes mounted thereon could then be mounted on the bolts 40.

While I have shown and described one embodiment of my invention, it is to be understood that it is capable of many modifications. Changes, therefore, in the construction and arrangement may be made without departing from the spirit and scope of the invention as disclosed in the appended claims.

I claim:

1. A motor-generator comprising: a rotor having motor and generator windings; a pair of cup shaped non-magnetic end bearing brackets which are circular in transverse section and are disposed in aligned spaced relationship with their open ends facing each other, said brackets each having bearing means in the closed end for rotatably supporting said rotor, and said brackets each having a peripheral flange at the open end providing a circumferential shoulder defining a recess at said open end; a field ring of substantially the same diameter as said recess, said ring comprising a pair of oppositely disposed cast permanent magnet members of very hard material having an unground arcuate outer surface, and a separate pair of field members each comprising a plurality of laminations of relatively soft ferrous material having an arcuate outer surface, the ends of said field members abutting the ends of said magnet members to form said ring, each field member having a shoulder at each end thereof abutting the inner surface of the adjoining magnet member and each magnet member having a radial dimension slightly smaller than the radial dimension of the field member measured from the shoulder thereon so that when said magnet member is seated on said shoulder the arcuate outer surface of said magnet member has a smaller radius than the arcuate outer surface of said field members; and means for readily removably securing said brackets in spaced relation with said field ring seated therebetween in said recesses to form a housing for said rotor, said flanges holding said ring in position and the small radial dimension of said magnet members permitting said ring to seat in said recesses despite irregularities in the unground outer surface of said magnet members.

2. A housing and magnetic assembly for a motor-generator and the like, comprising: a pair of non-magnetic end bearing brackets each having a peripheral flange providing a circumferential shoulder defining a recess; a field ring of substantially the same diameter as said recess, said ring comprising a pair of oppositely disposed cast permanent magnet members of very hard material having an unground arcuate outer surface, and a separate pair of field members of relatively soft ferrous material each having an arcuate outer surface, the ends of said field members abutting the ends of said magnet members to form said ring, each field member having a shoulder at each end thereof abutting the inner surface of the adjoining magnet member and each magnet member having a radial dimension slightly smaller than the radial dimension of the field member measured from the shoulder thereon so that when said magnet member is seated on said shoulder the arcuate outer surface of said magnet member has a smaller radius than the arcuate outer surface of said field members; and means for readily removably securing said brackets in spaced relation with said field ring seated therebetween in said recesses to form a housing and magnetic assembly, said flanges holding said ring in position and the small radial dimension of said magnet members permitting said ring to seat in said recesses despite irregularities in the unground outer surface of said magnet members.

JACOB BERTSCHI.

REFERENCES CITED

The following references are of record in the file of this patent:

UNITED STATES PATENTS

| Number | Name | Date |
| --- | --- | --- |
| 1,422,154 | Watson | July 11, 1922 |
| 1,937,677 | Weston | Dec. 5, 1933 |
| 2,105,513 | Welch | Jan. 18, 1938 |
| 2,161,953 | Dunham et al. | June 13, 1939 |
| 2,246,587 | Harmon | June 24, 1941 |
| 2,374,728 | Bone et al. | May 1, 1945 |

FOREIGN PATENTS

| Number | Country | Date |
| --- | --- | --- |
| 482,993 | France | Feb. 24, 1917 |
| 784,014 | France | Apr. 15, 1935 |
| 663,955 | Germany | Aug. 17, 1938 |